Patented July 14, 1942

2,289,576

UNITED STATES PATENT OFFICE 2,289,576

CHEESE COMPOSITION AND METHOD OF PREPARING THE SAME

Bert A. Jordan, Elgin, Ill., Forest H. Clickner, South River, N. J., and Arthur B. Erekson, Plymouth, Wis., assignors to The Borden Company, New York, N. Y., a corporation of New Jersey No Drawing. Application February 25, 1938, Serial No. 192,558

7 Claims. (Cl. 99—115)

This invention relates to cheese compositions and methods of preparing the same. More particularly, the invention concerns sprayable cheese and oil compositions and the preparation thereof.

Various low moisture compositions have been proposed heretofore, known as "cheese spray" mixtures, which have been designed for application to crackers, popcorn, or the like by spraying. These products have consisted of well defined discrete particles of cheese suspended in a fat or oil, such fat or oil being a solid at room temperatures in order to hold the cheese particles in suspension. Such compositions have been distinctly limited in the proportion of cheese that could be satisfactorily mixed with the fat, and relatively high spraying temperatures have been necessary because of the high melting point of the fat used as the carrier.

Cheese compositions which comprise a suspension of discrete cheese particles in a solid fat are also very difficult, if not impossible, to spray by the usual apparatus when they contain more than 50% cheese. For these reasons cheese compositions containing less than 50% cheese have been used, and it has been necessary to apply rather heavy coatings of the composition to popcorn or crackers in order to produce the desired cheese flavor. Furthermore, due to the high temperatures to which the cheese is subjected in preparing these products, the cheese in them was fairly high in separated fat, in the form of globules of separated fat encased within a layer of hardened casein. This is particularly true with spray dried low moisture cheese.

Our invention overcomes the difficulties with products heretofore known and one object is to provide a method of preparing dried cheese which minimizes the separation of fat therein as globules coated with hardened casein.

Another object is to provide a sprayable cheese composition containing more than 50% of cheese which may be sprayed using only a normal amount of pressure.

Another object of this invention is to provide a cheese spray composition containing cheese mixed with an edible oil that is liquid at room temperatures which may be sprayed at a temperature of 95° F. or less.

A further object is the provision of a simplified process of preparing cheese-fat or cheese-oil flavoring compositions.

In the preparation of our dried cheese, and the dried cheese thus prepared may be used for other purposes than incorporation with fat as a cheese spray mixture, the subjection of the cheese to high temperatures is preferably avoided. The cheese selected as a starting material may be any cheese in a cured marketable condition which is suitable in flavor. For example, an aged American or other cheese of good flavor containing around 40% moisture may be employed. This cheese is first creamed by forcing it under high pressure through a plurality of small openings, such as those of a woven wire screen of about 30 mesh. After passing through the screen, the cheese is immediately forced through extrusion orifices about $\frac{1}{16}$ inch in diameter. This creaming of the cheese by extrusion, conditions it in such a way that the use of emulsifying agents is rendered unnecessary and the cheese readily breaks down to form an emulsion with water upon the addition of heat.

Sufficient water is then mixed with the creamed extruded cheese to form a cheese-in-water emulsion containing about 20% solids. This may be accomplished by vigorous agitation, either using agitation or stirring devices, or by pumping the cheese and water mixture rapidly through a circulating system. Water heated to a temperature of about 140 to 160° F. is preferably added to the cheese at this stage although whey might be employed instead of the water. The addition of the cheese cools the water so that the cheese is not subjected to a high temperature, preferably not above 140° F. during the formation of the emulsion. This cheese-water mixture or emulsion prepared from the creamed cheese does not have to be homogenized, since a smooth creamy emulsion is obtained directly by the agitation.

This emulsion of cheese in water is then preferably dried at a low temperature under a vacuum to avoid heating the cheese any more than is necessary. For example, the cheese-water emulsion may be dried on any suitable vacuum roller of known construction that is heated to a temperature of about 135° F. or less. The dried cheese scraped from the vacuum roll is scraped off in flake form having a moisture content preferably below 10%. The drying operation may be regulated for example to produce a final moisture content in the flake cheese of around 4 to 5% although the particular moisture content is not critical. The flaked dried cheese obtained from the vacuum roll readily crumbles and may be further broken up by gently rubbing it through a screen or in any other suitable manner reducing it to a finely divided state without subjecting it to temperatures above about 135° F.

The flaked finely divided dried cheese prepared as described above may be used in cheese fillings or various other preparations. It is especially suitable for mixing with an edible fat or oil in any suitable manner to provide a high quality cheese spray mixture. The fat or oil selected may be a clear liquid at room temperature or it may contain stearines and/or other fatty components which solidify and tend to settle at room temperature. In fact, the fat or oil may be one that is solid at room temperatures. Any suitable edible refined oil, fat, or mixture thereof may be selected, preferably one that is substantially tasteless. For example, cocoanut, corn, cottonseed and/or sesame oils which have been refined and are preferably as tasteless as is practical may be employed to good advantage. One mixture of these oils which is particularly satisfactory is a mixture of equal parts by weight of refined sesame oil with 76° hydrogenated refined cocoanut oil. This mixture is a clear liquid without any trace of solids at room temperature. In general, the lower the viscosity of the oil used as a carrier, the more cheese can be satisfactorily incorporated with it, and the lower the spraying temperature may be.

While the exact manner of mixing the oil or fat with the cheese depends upon the oil or fat selected as a carrier and the final composition desired, we prefer to employ a relatively low melting point fat or oil and to divide the cheese to be added to the oil into several parts. For example, if a mixture containing 60 lbs. of dried cheese and 40 lbs. of an oil wholly liquid at 70° F. is to be made, we prefer to divide the cheese into three equal 20 lb. portions. The first portion of cheese is added to the oil and well stirred into it to form a thick paste. This paste is then homogenized to thoroughly incorporate the cheese and the oil. This operation also increases the fluidity of the mixture. The next 20 lbs. of cheese is then added to the product thus obtained, well stirred into it and this mixture homogenized. Finally the third 20 lb. portion of cheese is stirred into the product and the whole mixture homogenized to obtain the final product.

Homogenization may be conveniently carried out by the use of a viscolizer or a colloid mill as will be well understood by those skilled in the art. When a colloid mill is employed and the oil used is entirely liquid at room temperature, the cheese and oil may be mixed and colloidized without any heating. Where a viscolizer is employed, however, using a pressure of around 2,500 lbs. per square inch for example, we prefer to heat the oil before the cheese is added in order to prevent clogging of the orifices of the viscolizer. For example, if the fat used is cloudy or partially solid at room temperature, or if it is fully solid at room temperature, or with any fat or oil using a viscolizer, the oil is preferably heated to about 140° F. before the cheese is added. The addition of cheese to this heated oil reduces the temperature somewhat so that the mixture which is viscolized is not heated much, if any, above 120° F. Whether the product obtained is homogenized in a heated or unheated condition, it may be run directly into the cans or other containers which can be immediately placed in a cold room for storage. It is not necessary to agitate the material as it cools since the cheese and oil is so intimately mixed by our invention that the cheese will not separate from the carrier even at room temperatures.

In cheese spray mixtures heretofore known, it has been necessary to employ a fat which is solid at room temperatures and even with such a carrier, more than 50% of cheese could not be incorporated in the composition because of the nature of the cheese particles suspended in the fat. Such cheese particles were prepared and dehydrated at such high temperatures that a large portion of the particles consisted of cheese-fat surrounded with a case hardened coating of casein. When these particles were added to hot oil or fat, this casein became further hardened and consequently the particles or globules could not be homogenized with the same results obtained according to our invention.

Our invention provides good quality, readily sprayable compositions of cheese and oil which remain homogeneous although containing as much as 50 to 75% cheese. With such high cheese compositions, it is not necessary to apply as much of the mixture to crackers, popcorn, or the like to produce the desired cheese flavor as has been necessary heretofore. By this invention, a cheese spray mixture may be made with a normally liquid oil as carrier thereby producing a product which can be readily sprayed at temperatures but little more than room temperature. For example, we have prepared cheese spray mixtures containing 60% cheese which could be sprayed with the usual pressures and spraying equipment on popcorn at a temperature of 90° F. Where a normally solid fat carrier is employed, this solid carrier combined with a solid cheese produces a mixture which even with smaller quantities of cheese requires heating to a much higher temperature of the order of 135° F. for spraying.

Cheese spray mixtures may be prepared in accordance with this invention, using an oil liquid at room temperature as a carrier, which are capable of flowing at room temperature and still remain homogeneous. These mixtures consist essentially of minutely divided particles of casein which remain uniformly suspended in a true blend of the liberated cheese fat and the oil carrier, even when this blend is in a liquid condition. As contrasted with the products previously known, the suspended solid particles of our cheese spray mixtures are not readily discernible to the naked eye and do not settle out as a layer when the carrier remains liquid for some time. For these reasons, the compositions of this invention may be applied at lower temperatures and with greater ease to popcorn, crackers and the like.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A method of preparing cheese flavoring comprising successively mixing increments of low moisture cheese that has been dried at temperatures below about 140° F. with substantially anhydrous refined edible oil and homogenizing the oil and cheese mixture after the addition of each increment of cheese.

2. A method of preparing a cheese spray composition comprising forming an emulsion of cheese in water, drying said emulsion under a partial vacuum at a temperature not greater than 140° F., adding a portion of said dried cheese to refined substantially anhydrous edible oil, homogenizing said oil and cheese, adding another portion of dried cheese to the homogenized mass, and homogenizing the mass.

3. A method of preparing a cheese spray composition comprising creaming and drying cheese at a temperature not greater than 140° F., adding a portion of said dried cheese to refined substantially anhydrous edible oil to form a paste, homogenizing said paste, and repeating the addition of cheese portions thereto and homogenizing until the desired proportion of cheese has been incorporated.

4. A method of forming a cheese spray composition comprising creaming cheese by extrusion, incorporating said cheese in water with agitation to form an emulsion, drying said emulsion on a vacuum roll at a temperature not greater than 140° F., adding about one part of said dried cheese to about two parts refined edible oil liquid at room temperatures to form a paste, homogenizing said paste to lower the viscosity thereof, and repeating the addition of cheese portions thereto and homogenizing until the desired proportion of cheese has been incorporated with the oil.

5. A process of preparing a cheese spray composition comprising mixing successive increments of a dried cheese substantially free from fat globules encased in hardened casein with a quantity of a liquid refined substantially anhydrous edible oil, and homogenizing such mixtures sufficiently to increase the fluidity thereof.

6. A process of preparing a cheese composition suitable for application to edible products by spraying comprising mixing successive increments of cheese that has been creamed by extrusion under pressure and dried at a sufficiently low temperature to prevent the formation of fat globules encased in hardened casein, with a quantity of a refined substantially anhydrous edible oil, and homogenizing said mixtures to form a stable suspension of said cheese in said oil.

7. A process of preparing a cheese composition suitable for application to edible products by spraying comprising creaming cheese by extruding it under pressure, forming an aqueous emulsion of said creamed cheese, roller drying said emulsion at a temperature sufficiently low to prevent formation of fat globules encased in hardened casein, mixing a portion of said dried cheese with a quantity of refined edible oil to form a paste, homogenizing said paste, mixing a further portion of said dried cheese with said homogenized paste, and homogenizing said mixture.

BERT A. JORDAN.
FOREST H. CLICKNER.
ARTHUR B. EREKSON.